July 1, 1930.  R. EHRENFELD  1,768,896
MOTOR STARTING MEANS
Filed May 10, 1929  2 Sheets-Sheet 1

INVENTOR
Ralph Ehrenfeld.
BY
ATTORNEY

July 1, 1930.  R. EHRENFELD  1,768,896
MOTOR STARTING MEANS
Filed May 10, 1929   2 Sheets-Sheet 2
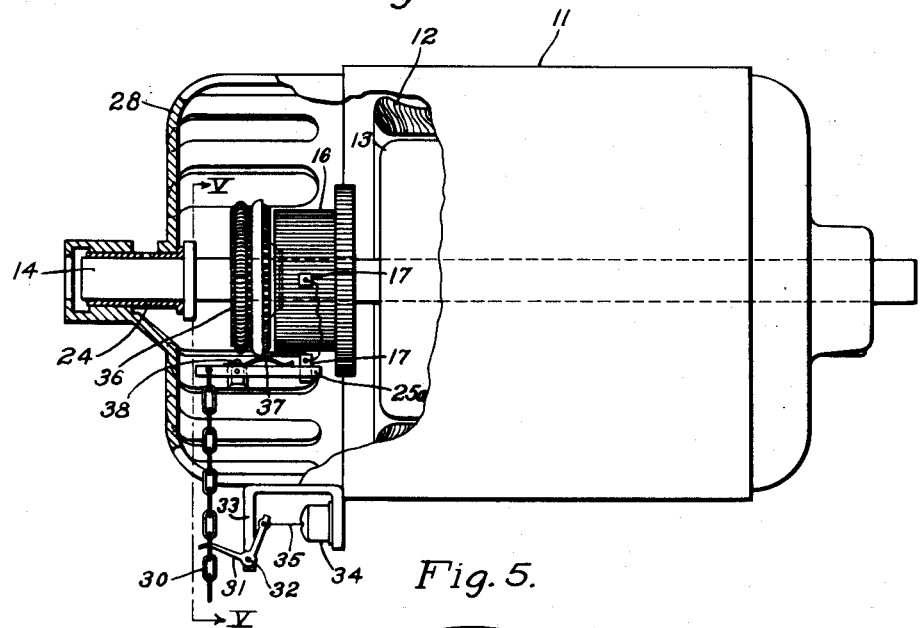
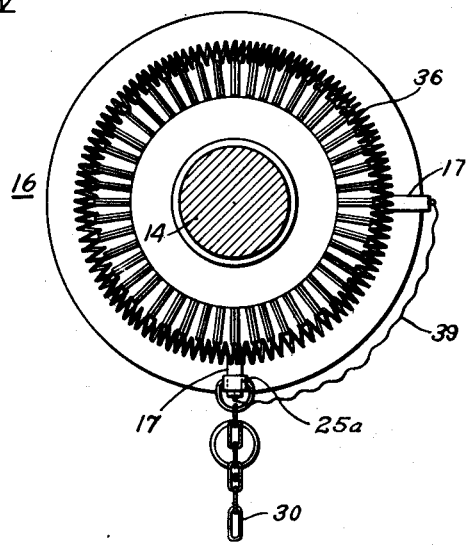
INVENTOR
Ralph Ehrenfeld.
BY
ATTORNEY Patented July 1, 1930

1,768,896

UNITED STATES PATENT OFFICE

RALPH EHRENFELD, OF SPRINGFIELD, MASSACHUSETTS, ASSIGNOR TO WESTINGHOUSE ELECTRIC & MANUFACTURING COMPANY, A CORPORATION OF PENNSYLVANIA

MOTOR-STARTING MEANS

Application filed May 10, 1929. Serial No. 361,945.

My invention relates to new and useful improvements in the operation of electric motors and particularly to the starting of induction motors.

An object of my invention is to provide a simple, manually-operable mechanical means for starting electric machines as repulsion motors and providing for their subsequent operation as induction motors.

Another object of my invention is to insure positive continued action of a mechanical means for effecting the starting of an electric machine as a repulsion motor and providing for its normal operation as an induction motor.

Another object of my invention is to manually operate a mechanical means for both starting and stopping an electric machine.

Another object of my invention is to provide a simple, cheap and effective brush-lifting and short-circuiting means.

In the accompanying sheets of drawings,

Fig. 4 is a view, corresponding to Fig. 1, embodying a centrifugally-actuable short circuiter in place of the mechanically-actuable short circuiter.

Fig. 5 is an end view of my invention, as applied to a rotor, showing the rotor shaft in section and illustrating a centrifugal short circuiter of one type more in detail.

Figure 1:
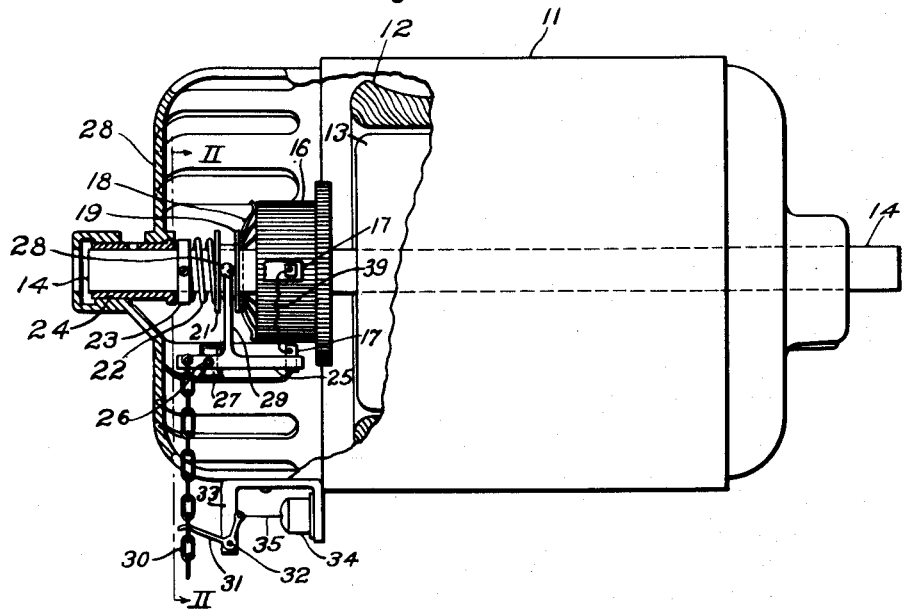
Figure 1 is a longitudinal view of an electric motor, partially in elevation and partially in section, showing an embodiment of my invention as applied thereto.
Figure 2:
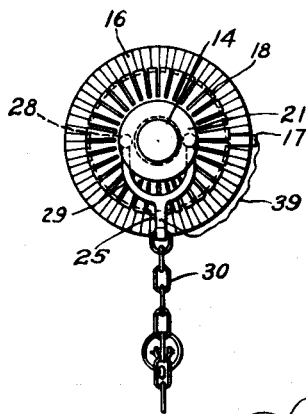
Fig. 2 is a view, in lateral section, of my invention showing more clearly the relation of the short circuiter to the commutator and mechanical means for its movement with respect to the commutator and armature shaft, taken on the line II—II of Fig. 1.

In the first sheet of drawings, is illustrated one embodiment of my invention, referring more particularly to Figs. 1 and 2. In the second sheet of drawings, and more particularly in Figs. 4 and 5, is illustrated another form of my invention.

I have illustrated an electric machine comprising a stator 11 having field coils 12, and a rotor comprising an armature 13, a commutator cylinder 16, and a shaft 14. This commutating means is shown schematically only, and, in a four-pole repulsion-induction motor, could comprise two brushes 17 properly supported in brush-holders and electrically connected together, all in a manner well known in the art.

My short-circuiting device comprises a plurality of radially extending resilient fingers 18 adapted to short-circuit the bars of the commutator cylinder 16, by making proper contact therewith, the inner ends of the fingers being integral with a ring 19 which is a part of, or attached to, a grooved ring 21. The short-circuiting device is adapted to move longitudinally of the shaft 14 and, under normal conditions, a compression spring 22 located between the ring 21 of the short circuiter and a disc 23 secured on the shaft 14 adjacent to the inner end of a bearing sleeve 24, acts to hold the resilient fingers 18 of the short-circuiting device in contact with the ends of the bars of the commutator cylinder 16. A member 25 of inverted T shape is pivotally supported at 26 upon a block 27, with which the end bell 28 is provided. The vertical arm 29 of the member 25 is bifurcated to embrace the groove portion of the ring 21.

The inner end of the horizontal arm of the member 25 supports a brush 17 and its outer end is attached to one end of a pull chain 30.

When the chain 30 is pulled down to move the brush 17 into contact with the commutator cylinder 16, the short-circuiting device is moved longitudinally upon the shaft 14, by the action of the bifurcated arm 29 upon the grooved collar 21, and the spring 22 is compressed.

The resilient fingers 18 of the short-circuiting device are thus moved out of contact with the bars of the commutator cylinder 16. The chain 30 is engaged by one arm of a bell crank-lever 31 which is pivoted at 32 upon a bracket 33. The other arm of the bell-crank lever 31 is connected to the movable member of a line switch 34 by a pull rod or cord 35 so that, when the chain 30 is pulled down the bell-crank lever 31 will be actuated to open the switch.

When the chain 30 is released, the spring 22 moves the short-circuiting device longitudinally on the armature shaft 14 to cause the fingers 18 of the short-circuiting device to engage the ends of the bars of the commutator cylinder 16. Movement of the short-circuiting device by the compressed spring 22 also rocks the member 25 on its pivot 26 to disengage the brush 17 from its contact with the commutator cylinder 16.

In Fig. 4 I have represented a modification of my invention wherein the short-circuiting device before described is replaced by a centrifugally actuated short-circuiting switch 36, the operation of which is mechanically independent of the means for moving the brush 17 with reference to the commutator cylinder 16 and the line switch 34.

The means for moving the brush 17 with respect to the commutator cylinder 16 and for actuating the line switch 34 is substantially as before described, with the exception that the member 25ª corresponding to the member 25 has no bifurcated arm 29 for controlling the action of a mechanically operated short-circuiting switch. The free end of a spring 37, which is rigidly mounted at 38 engages the long arm portion of the member 25ª to hold the brush 17 out of contact with the commutator cylinder 16 at all times except when the pull chain 30 is pulled down to actuate the line switch 34.

The short-circuiting switch 36 is actuated, at a predetermined speed of the rotor, to short circuit the commutator cylinder 16 in a manner well known in the art.

Should the motor be subjected to a heavy overload, the speed of the rotor would drop and the contactor portions of the centrifugally-operated switch 36 would move out of engagement with the commutator cylinder 16, and the motor would then have no torque. This feature is especially important in the case of the motor being used for washing-machine service.

Figure 3:
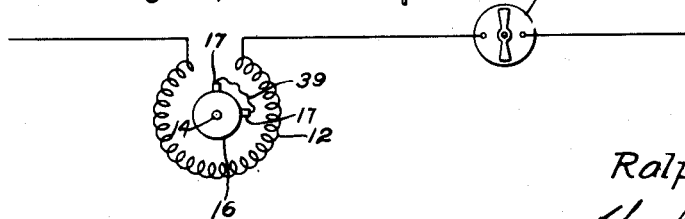
Fig. 3 is a schematic wiring diagram of the circuit for an electric machine.

In Fig. 3 I have shown schematically the line switch 34 adapted to alternately complete and interrupt the line circuit, thereby providing for the controlling of the energization of the field winding 12. The commutator cylinder 16 is also shown schematically, with the commutating means thereon and an electrical connector 39 between brushes constituting such means.

Although I have shown a mechanical means for removing only one brush from contact with the commutator cylinder, it is obvious that mechanical means may be so employed as to effect the removing all of the commutating means from such contact. It is also obvious that the type of line switch for the control of the energization of the field winding may differ from the type which I have indicated, providing, of course, that the line circuit is alternately closed and opened.

It is also obvious that it is not necessary to actuate the line switch 34 each time the motor is to be started or stopped. The usual manually-operable switch may be provided and, in starting the motor, it may first be closed and the pull chain be actuated as was hereinbefore set forth. In case of a shut-down of a motor having a centrifugally-actuable short-circuiting device associated therewith, the energy loss in the energizing winding will be relatively small and it is only necessary that the operator again actuate the chain to cause the brush or brushes to engage the commutator cylinder to restart the motor.

I am aware that my invention may be modified, as regards to the mechanical details thereof, without departing from its spirit and scope.

I claim as my invention:

1. In a repulsion-induction motor having a stator winding, a control switch therefor, a rotor including a commutator cylinder, a commutator-short-circuiting device, and a commutating means normally yieldingly held out of engagement with the commutator cylinder, means for effecting starting of the motor including a manually-operable means for simultaneously effecting closing of the control switch and engagement of the commutating means with the commutator cylinder.

2. In a repulsion-induction motor having a stator winding, a circuit-control switch therefor, a rotor including a commutator cylinder, a commutator-short-circuiting means normally yieldingly held in operative engagement with the commutator cylinder and a commutating means normally yieldingly held out of operative engagement with the commutator, means for effecting starting of the motor including a single manually-operable means for simultaneously effecting disengagement of the short-circuiting means from the commutator cylinder, engagement of the commutating means with the commutator cylinder and actuation of the switch to its closed position.

In testimony whereof, I have hereunto subscribed my name this 30th day of April, 1929.

RALPH EHRENFELD.